3,301,790
METAL OXIDE-CARBON ORGANOSOL PROCESS AND PRODUCT

Frederick T. Fitch, Baltimore, and Ann B. Braun, Rockville, Md., assignors to W. R. Grace & Co., New York, N.Y., a corporation of Connecticut
No Drawing. Filed Sept. 24, 1964, Ser. No. 399,102
10 Claims. (Cl. 252—301.1)

This invention relates to a colloidal carbon dispersion in organic media, colloidal carbon with colloidal metal oxides dispersed in organic media, and processes for forming these dispersions.

In summary, the process of this invention comprises treating an aqueous dispersion of colloidal carbon, either alone or in mixture with an aqueous sol consisting of zirconia, alumina, actinide oxides such as urania and thoria, rare earth oxides such as ceria and yttria sols, and mixtures thereof with a low solubility organic acid in an amount of from about 2.5/R to 5.6/R moles of acid per mole of colloidal particles wherein R is the average radius of the particles in millimicrons; mixing the organic acid-treated aqueous sol with an organic extractant whereby the acid-treated sol particles are extracted into the organic extractant; and removing water from the mixture.

In summary, the composition of this invention comprises an organic extractant selected from the group consisting of aliphatic alcohols having at least 4 carbons, benzyl alcohol, furfural, carbon tetrachloride, tetrachloroethane, isopropyl ether, ethyl acetate, and aromatic hydrocarbon liquids such as benzene, containing dispersed therein organic acid-coated colloidal particles consisting of carbon, either alone or in mixture with a member selected from the group consisting of zirconia, alumina, actinide oxides such as urania and thoria, rare earth oxides such as ceria, and mixtures thereof.

Nuclear fuel elements can be prepared from actinide carbides and other metal carbides. These metal carbides can be prepared by sintering mixtures of the corresponding metal oxides and carbon. Use of colloidal metal oxides and carbon particles greatly facilitates the reaction between the materials to form dense carbide systems. As disclosed in copending application Serial No. 356,940, filed April 2, 1964, the required colloidal mixture of the metal oxides and carbon can be obtained from the respective aquasols. In normal production, the carbon and metal oxides particles must remain uniformly dispersed to provide a homogeneous metal oxide-carbon mixture in the dried product. However, difficulties have been encountered in the aqueous system. Stable dispersions of carbon particles are difficult to obtain, unless very elaborate precautions are taken, they tend to agglomerate and settle from the aqueous phase. Control of the surface charge of the carbon particles, a technique employed to stabilize the carbon suspension, often interferes with the stability of the metal oxide particles in the suspension. Furthermore, only dilute aqueous suspensions can be made without interfering with the stability thereof.

It is one object of this invention to produce highly stable colloidal carbon dispersions in organic media.

It is another object of this invention to provide a colloidal carbon dispersion which can be readily mixed with metal oxide dispersions to form a composition which is suitable for reaction to form carbide systems.

It is another object of this invention to form mixed dispersions of colloidal carbon and colloidal metal oxides which are not highly dependent for stability upon the surface charge thereof.

It is still a further object of this invention to provide carbon organosols for making carbon-metal oxide suspensions which can be concentrated without being rendered unstable.

Carbon-metal oxides organosols can be prepared by several different procedures, each procedure beginning with an aquasol. Dispersions of colloidal carbon in an organic solvent can be made from a carbon dispersion in an aqueous medium by the process of this invention. The carbon dispersion, termed herein as a carbon organosol, can thereafter be mixed with a metal oxide organosol to obtain the required carbon-metal oxide organosol. The process of this invention can comprise the steps of preparing the carbon organosol, extracting the colloidal metal oxide particles from a metal oxide aquasol into the carbon organosol to obtain the desired carbon-metal oxide organosol. By the process of this invention, the desired carbon-metal oxide organosol can be obtained by directly extracting the carbon and metal oxide particles from a carbon-metal oxide aquasol into the organic solvent.

The preparation of aqueous dispersions of colloidal carbon particles is described in copending application Serial 356,940. This dispersion can be conveniently prepared by contacting a carbon-water mixture with an ultrasonic probe, thereby dispersing the carbon in the aqueous medium. The dispersion can also be prepared using grinding techniques or commercially available blending devices.

Aquasols of zirconia, alumina, actinide oxides such as urania and thoria, and rare earth oxides such as ceria and yttria are well known. One suitable method of preparing thoria sols is described in U.S. Patent 3,097,175. A method for froming thoria-urania sols is described in U.S. Patent 3,091,592. Other suitable methods for forming the metal oxide sols includes electrodialysis, ion exchange or peptization.

It has been found that if the aqueous carbon dispersion is mixed with an organic acid, the carbon can be then extracted into an organic liquid by mixing, the carbon retaining its colloidal characteristics in the organic medium. It has also been found that both the carbon and metal oxides particles contained in a carbon-metal oxide aquasol can be extracted into an organic liquid if the carbon-metal oxide aquasol is treated with an organic acid, and the acid treated aquasol is then mixed with the organic liquid.

Organic acids which have been found to be suitable for treating the aquasols must have a relatively low water solubility. These acids include straight chain fatty acids such as caproic, heptoic, caprilic, and decanoic acid; branch chain fatty acids such as isovaleric, isocaproic; phenyl derivatives of fatty acids such as alpha-phenyl propionic acid and benzoic acid. Benzoic acid is preferred since it is a solid and can be easily handled.

The quantity of the organic acid employed to treat the colloidal material is important. If an insufficient quantity of organic acid is employed, transfer of the colloidal solids into the organic phase during the extraction step is incomplete or ceases to occur. Excessive quantities of organic acid causes precipitation or agglomeration of the sol particles and prevents the formation of the organosol. The quantity of organic acid, expressed as moles of acid per mole of sol particles, required for various colloidal materials can be within the approximated range of from 2.5/R to 5.6/R and is preferably within the range of from about 3.4/R to 4.6/R wherein the average particle radius in millimicrons, R, is expressed by the following equation:

$$R = \Sigma r/n$$

wherein $r$ = individual particle radius in millimicrons.
$n$ = number of particles in sample measured.

When the sol particles of carbon and actinide oxide, for example uranium dioxide, are within the range of 20 to 50 millimicrons in size, a quantity of organic acid equivalent to from about 0.12 to 0.28 mole of organic acid per mole of colloidal material and preferably from about 0.17 to 0.23 mole of organic acid per mole of colloidal material can be employed.

The aquasol is treated with the organic acid by completely mixing the aquasol with the acid, and then allowing the mixture to stand until reaction forming the organic coating on the sol particles is complete. Usually, standing for from 3 to 15 minutes is satisfactory. Some flocculation and settling of the colloidal particles may be observed during the treatment, but the particles are easily redispersed by means of agitation.

The acid-treated aquasol is then mixed with the water-immiscible organic extracting liquid. The term "water-immiscible" is used to indicate organic liquids which are not soluble in water in all proportions. Organic extracting liquids which have been found suitable include benzyl alcohol, carbon tetrachloride; furfural; tetrachloroethane; primary and secondary monohydrate alcohols containing at least 4 carbons, for example n-butanol, n-amyl alcohol, n-hexanol, n-heptanol, n-octanol, etc.; branch chain alcohols such as isobutanol, isoamyl alcohol, 2,2,4-trimethyl-1-hexanol; secondary alcohols such as 2 butyl, 2 pentanol, 2 octanol, etc. Other extractant solvents which have been found suitable include aromatic liquids such as benzene, ethers such as isopropyl ether, and esters such as ethylacetate.

After the acid-treated aquasol is mixed with the organic extracting liquid, the water phase is separated from the organosol phase. The residual dissolved water in the organosol can be removed by any well known technique. Azeotropic distillation of the organosol gives an anhydrous product. Further distillation of the organosol can be used to remove a portion of the organic extracting solvent, producing organosols having a higher solids concentration, for example organosols having a concentration of sol particles greater than 50 weight percent.

A carbon-metal oxides organosol can be formed from the carbon organosol by treating a metal oxide aquasol with an organic acid as above described, mixing the acid treated oxide aquasol with the carbon organosol to extract the metal oxide particles into the organic phase, and dehydrating the carbon-metal oxide organosol formed.

Another technique for forming a carbon-metal oxide organosol which has been found to be suitable comprises treating a metal oxide-carbon aquasol directly with an organic acid, as above described, mixing the acid treated aquasol with an organic extracting solvent, and dehydrating the carbon-metal oxides organosol formed, by distillation, for an example.

The carbon organosols formed by the process of this invention comprise colloidal carbon having a surface coating of an organic acid which has a low solubility in water, dispersed as colloidal size particles in an organic solvent.

The metal oxide-carbon organosols of this invention are highly stable mixtures of acid-coated colloidal carbon and metal oxide particles in an organic solvent in any relative proportion. For formation of uranium dicarbide, the carbon to metal ratio in the organosol should be about from 4 to 5.5 and preferably from about 4.5 to 5.0. Similar stoichiometric considerations would dictate the ratios required to form other carbides.

Further aspects of this invention will be apparent from the following specific but non-limiting examples.

*Example 1*

A 0.25 gram sample of colloidal carbon was dispersed in 5 ml. of water by use of an ultrasonic probe. A thick dispersion was obtained. To this dispersion, 0.52 gm. of benzoic acid were added, and the materials were mixed by stirring. The acid-treated dispersion was then intimately mixed with 10 ml. of carbon tetrachloride, and was allowed to stand until a clear supernatant and a black organosol layer was formed, a period of about 3 minutes. The organosol phase was drained from the supernatant aqueous phase. The organosol showed no detectable precipitation after standing for several days, readily demonstrating the high stability of the product.

*Example 2*

This example shows the formation of a carbon-urania organosol from the corresponding mixed aquasol.

A 7.5 ml. sample of a $UO_2$ sol containing about 15 weight percent $UO_2$ was mixed with 0.13 gm. of benzoic acid. A 0.25 gm. sample of colloidal carbon black was dispersed in 4 ml. of water using an ultrasonic probe and was then mixed with 0.52 gm. of benzoic acid. The acid-treated urania aquasol and the acid-treated carbon dispersion were then mixed, and the mixture was intimately contacted with 10 ml. of benzyl alcohol. After the extraction was complete, the organosol was separated from the supernatant aqueous phase. The uranium dioxide-carbon organosol obtained was highly stable.

The organosols formed by the process of this invention are relatively stable, substantially independent of the surface charge on the sol particles. These organosols can be readily mixed with other organosols to form any desired mixture for carbide production and can be easily converted to a stable, highly concentrated organsol by simple evaporation of a portion of the solvent.

Obviously, many modifications and variations of the invention as hereinabove set forth may be made without departing from the essence and scope thereof, and only such limitations should be applied, as are indicated in the appended claims.

We claim:
1. A process for forming a carbon-metal oxide organosol comprising steps of
    (a) mixing an aqueous dispersion of colloidal carbon with an organic carboxylic acid which is slightly soluble in water,
    (b) mixing the acid-treated carbon suspension with a water-immiscible organic liquid and thereby forming a carbon organosol,
    (c) mixing an aquasol of metal oxide selected from the group consisting of actinide oxides, rare earth oxides, alumina, zirconia, and mixtures thereof with an organic carboxylic acid which is slightly soluble in water,
    (d) mixing the acid-treated metal oxide aquasol with the carbon organosol, and
    (e) removing water from the mixture wherein the quantity of acid added to the dispersion and aquasol in moles of acid per mole of colloidal material is from about $2.5/R$ to $5.6/R$ wherein R is the average radius of the sol particles in millimicrons.

2. The process of claim 1 wherein the metal oxide is selected from the group consisting of urania, thoria, and mixtures thereof.

3. The process of claim 1 wherein the quantity of acid added to the dispersion and aquasol is from about $3.4/R$ to $4.6/R$ moles of organic acid per mole of colloidal material.

4. The process of claim 1 wherein the carbon and metal oxide are within the range of from about 20 to 50 millimicrons in size, and the quantity of organic acid added to the dispersion and aquasol is within the range of from about 0.12 to 0.28 mole of organic acid per mole of colloidal material.

5. A process for forming a carbon-metal oxide organosol comprising the steps of
    (a) mixing an aqueous dispersion of colloidal carbon and colloidal metal oxide selected from the group consisting of actinide oxides, rare earth oxides, alumina, zirconia, and mixtures thereof with an organic carboxylic acid which is slightly soluble in water, the quantity of organic acid employed being from about $2.5/R$ to $5.6/R$ moles of acid per mole of colloidal material wherein R is the average radius of the colloidal particles in millimicrons, (b) mixing the acid-treated carbon-metal oxide suspension with a water-immiscible organic liquid, and
(c) removing water from the mixture.

6. Process of claim 5 wherein the metal oxide is selected from the group consisting of urania, thoria, and mixtures thereof.

7. The process of claim 5 wherein the carbon and metal oxide are within the range of from about 20 to 50 millimicrons in size, and the quantity of organic acid added to the dispersion and aquasol is within the range of from about 0.12 to 0.28 mole of organic acid per mole of colloidal material.

8. A process for forming a carbon organosol comprising the steps of
(a) mixing an aqueous dispersion of colloidal carbon with from about $2.5/R$ to $5.6/R$ moles of an organic carboxylic acid per mole of carbon wherein R is the average radius of the carbon particles in millimicrons,
(b) mixing the acid-treated carbon suspension with a water-immiscible organic liquid, and
(c) removing water from the mixture.

9. A carbon-metal oxide organosol composition comprising organic carboxylic acid-coated colloidal carbon and an organic carboxylic acid-coated colloidal metal oxide selected from the group consisting of actinide oxides, rare earth oxides, alumina, zirconia, and mixtures thereof dispersed in a water-immiscible organic liquid.

10. A carbon organosol composition comprising organic carboxylic acid-coated colloidal carbon dispersed in a water-immiscible organic liquid.

References Cited by the Examiner
UNITED STATES PATENTS
3,171,715  3/1965  Kleinsteuber _____ 252—301.1

BENJAMIN R. PADGETT, *Primary Examiner.*

S. J. LECHERT, JR., *Assistant Examiner.*